United States Patent

[11] 3,619,799

[72] Inventor Harlan J. Oelke
Washington, D.C.
[21] Appl. No. 5,075
[22] Filed Jan. 22, 1970
[45] Patented Nov. 9, 1971
[73] Assignee The United States of America as represented by the Secretary of the Army

[54] NUCLEAR HARD VIDEO AMPLIFIER
7 Claims, 4 Drawing Figs.

[52] U.S. Cl. .......... 330/29, 330/33, 330/145
[51] Int. Cl. .......... H03g 3/30
[50] Field of Search .......... 330/29, 33, 144, 145; 307/308

[56] References Cited

UNITED STATES PATENTS

| | | | |
|---|---|---|---|
| 3,233,177 | 2/1966 | Stone .......... | 330/29 X |
| 3,243,719 | 3/1966 | Scaroni .......... | 330/145 X |
| 3,315,175 | 4/1967 | Shepherd .......... | 330/29 |
| 3,409,839 | 11/1968 | Crowe .......... | 330/33 |
| 3,461,300 | 8/1969 | Braun .......... | 330/33 X |
| 3,524,999 | 8/1970 | Fletcher et al. .......... | 307/308 |

*Primary Examiner*—John Kominski
*Assistant Examiner*—James B. Mullins
*Attorneys*—Harry M. Saragovitz, Edward J. Kelly, Herbert Berl and J. D. Edgerton

ABSTRACT: A video amplifier circuit which exhibits stability of gain under neutron bombardment. Nuclear radiation in the order of $10^{15}$ neutrons/cm.$^2$ (nvt) causes changes up to 90 percent in transistor beta. The amplifier includes a bias circuit for compensation of the beta change to maintain near constant gain.

PATENTED NOV 9 1971 3,619,799

INVENTOR.
HARLAN J. OELKE

BY Harry M. Saragovitz, Edward J. Kelly, Herbert Berl, John D. Edgerton
ATTORNEYS

NUCLEAR HARD VIDEO AMPLIFIER

Certain industrial and research environments demand the operation of electronic devices while subject to nuclear radiation. This requirement is often difficult to satisfy in environments involving neutron bombardment magnitudes in the order of $10^{15}$ neutrons/cm.$^2$. This difficulty arises from the great decline in the base-collector current amplification factor beta (up to 90 percent) of a transistor when the transistor is subject to such bombardment.

It has been found that extended exposure to fast neutron flux having a certain line density has different effects upon different semiconducting materials. On germanium, for example, the effect of fast neutron radiation has been catastrophic. Fast neutron bombardment has been found to cause conversion of germanium material between P- and N-types. However, because germanium has a higher minority carrier diffusion constant and a higher base lifetime damage constant, much work has been done in the analysis and application of germanium transistors. Silicon, on the other hand, while affected, does not undergo such conversion.

Fast neutron radiation affects the minority carrier lifetime of both P- and N-type silicon. Thus, one mode of silicon transistor failure by radiation is loss of gain by atomic displacement which damages the minority carriers by reducing their lifetimes.

The prior art is aware of the problem of maintaining constant the gain of a transistor amplifier subject to radiation, and particularly to heavy neutron bombardment. For example, the Crowe U.S. Pat. No. 3,409,839 is concerned with a method and apparatus for neutralizing the charge deposited on the junction of a semiconductor as a result of ionizing radiation. In U.S. Pat. No. 3,379,989 to Shafer, the problem of constant amplifier gain with neutron bombardment is attempted by the use of negative feedback. However, the Shafer system requires transformers for its described mode of operation. For wide frequency range operation, transformers sometimes are rather large and hence not easily adaptable to certain requirements where size is a factor.

According to the practice of the present invention an amplifier for compensating for large transistor beta changes is formed of components susceptible of integrated circuit fabrication, particularly at the lower frequency region. Further, each stage of the amplifier of the invention may be readily cascaded to achieve higher gains without separate impedance matching networks.

The DC, low-frequency, and high-frequency characteristics of most transistors vary greatly and differently when exposed to nuclear radiation. Generally the "DC-beta" change is the greatest for a given level of nuclear radiation. This beta change also affects the input impedance characteristics of a transistor as well as many transistor circuits, i.e., $Z_{in}$ for an emitter-follower circuit is approximately equal to beta $R_e$, where $R_e$ is primarily made up of the external emitter-biasing resistor and emitter load. Specifically, the invention utilizes variable attenuator means in the form of diodes. The attenuation means functions to maintain constant input impedance for each cascaded stage of an amplifier. By maintaining constant input impedance, the gain of the amplifier is maintained substantially uniform for transistor beta changes up to 90 percent.

Figure 1:
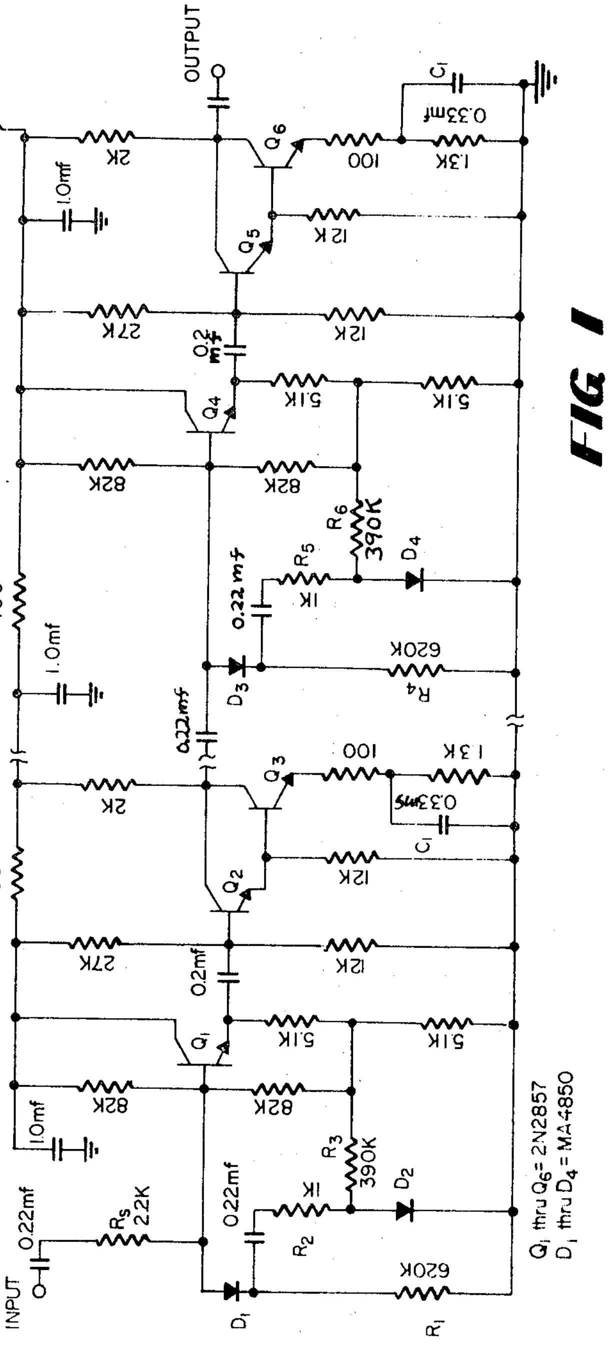
FIG. 1 is a schematic diagram of a two-stage, radiation tolerant amplifier made in accordance with the present invention.

Referring now to the drawings, FIG. 1 shows a two-stage amplifier employing a modified Darlington circuit, the latter consisting of transistors $Q_2$–$Q_3$ and $Q_5$–$Q_6$, respectively. The first stage is defined by $Q_1$, $Q_2$, $Q_3$ and associated circuitry, the second stage is defined by $Q_4$, $Q_5$, $Q_6$ and associated circuitry. It will be understood however that the invention is not limited to the modified Darlington. It was found that nuclear radiation of $10^{15}$ nvt caused an input impedance variation of each stage from 8K ohms down to 6K, with transistor beta change from 100 to 12, for the illustrated Darlington. The energy of the incident radiation was greater than 10 kev.

For a generator impedance of 2K this represents a loss in voltage gain due to additional loss in generator impedance which is denoted by $R_g$. As $Z_{in}$ diminishes the voltage drop across the generator impedance $R_g$ becomes proportionally larger thereby causing a change in voltage gain for each stage of amplification. Consequently, in a 60 to 80 db. amplifier this represents a 3 to 4 db. change in overall gain, for a 90 percent beta change. Variations of this order are more than can be tolerated in some cases.

In order to minimize this change in gain by the effect of nuclear radiation, the Darlington is modified so as to maintain a constant input impedance for each amplifier stage, $Q_2$ and $Q_3$ being the active elements in the first stage, while $Q_1$ is the active element in its emitter-follower. The emitter-follower stage is essentially an impedance transformer with a voltage gain of nearly unity.

Figure 2:
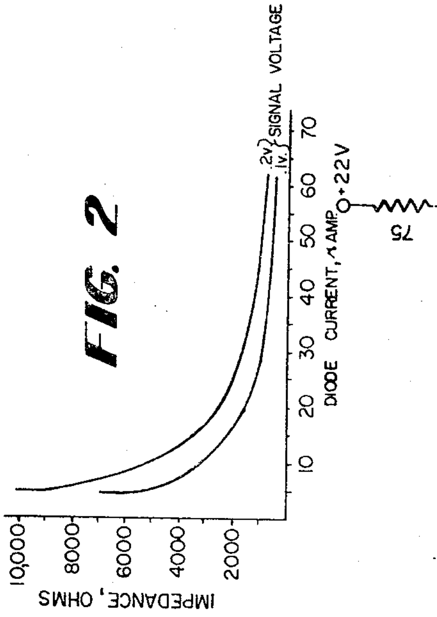
FIG. 2 is a typical plot of AC impedance in ohms against diode current in microamperes for any of the diodes $D_1$ through $D_4$ of the amplifier of FIG. 1.
Figure 3:
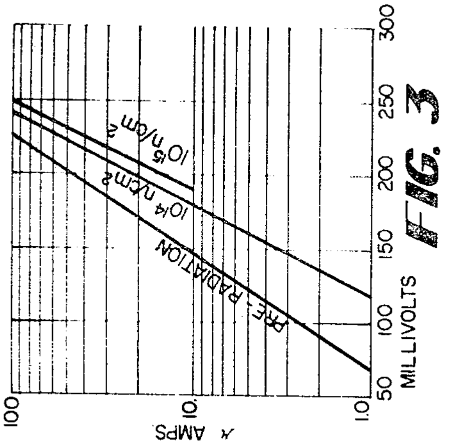
FIG. 3 is a plot, in semilog form, of the forward bias characteristics for any of the diodes $D_1$–$D_4$ of the amplifier of FIG. 1, and illustrates the effect of nuclear radiation.

The diodes $D_1$ and $D_2$ and their associated resistances in the first stage make up the variable attenuator. The indicated characteristics for these diodes are illustrated in FIGS. 2 and 3. Gain compensation is achieved in the following manner. The resistors $R_1$ and $R_3$ are selected to provide that diode current which yields maximum diode impedance change for a given change, delta, in diode current. $R_2$ is a damping resistor whose value is small compared to $R_3$. In general, the values of these resistances are chosen such that $R_1>R_3>R_2$. Under quiescent (nonradiation) conditions small currents pass through the diodes $D_1$ and $D_2$.

Upon the incidence of neutron bombardment, beta or transistor $Q_1$ diminishes, causing the collector current to diminish. Consequently, the base and emitter potentials likewise diminish. As a result of the reduction in the base and emitter voltages, the current through diodes $D_1$ and $D_2$ similarly diminishes, thereby effectively increasing the resistance across them, as is seen by reference to FIGS. 2 and 3. This in turn compensates for the change in input impedance of the emitter-follower state ($Q_1$) and maintains a nearly constant load on the generator $R_g$. This constant load results in a constant gain for the entire modular amplifier circuit. It is to be noted that $R_g$ represents, in general, the constant output impedance of a previous stage, the input impedance to the shown amplifier.

The gain of the modular circuit "building-block," with normal transistors (beta 100) is approximately 22 db. When replaced with transistors having betas between 12 and 17 the change in gain was in the order of 0.1 db. or approximately 1 percent ($C_1$ can be selected to give low frequency cutoff). The same results are obtained when the temperature was changed from −55° C. to +74° C. It will be noted that all of the elements may be fabricated on a silicon chip or may be made by known integrated circuit techniques. It will further be noted that the diodes $D_1$ and $D_2$ may be regarded as variable resistors, by virtue of their impedance change with current through them in the manner described above.

The overall gain of the two-stage amplifier shown in FIG. 1 was approximately 43 db. Measurements of gain vs. radiation over a frequency range of 10 kHz. to 1 MHz. showed a change in gain of less than 0.3 db. for an accumulated radiation level up to and including $10^{15}$ nvt (E>10 kev.). The thus cascaded amplifier was operated during the radiation pulse and no problems of recovery could be noted.

Figure 4:
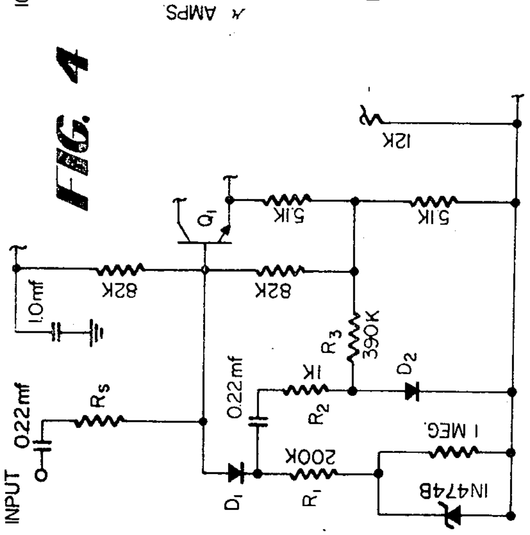
FIG. 4 is a fragmentary view similar to FIG. 1, and illustrates a modification.

Referring now to FIG. 4 of the drawings, a modification is shown. An additional resistor and a Zener diode in parallel are placed in series with $R_1$, the left most resistor in the variable attenuation network for each stage. The remaining circuitry, not shown, is the same as that of FIG. 1. The function of the Zener diode is to produce large changes of current through the first diode $D_1$, which results in impedance changes across $D_1$. This additional compensation provided by the changing diode impedance, along with the negative feedback in the amplifier, maintains a nearly constant amplifier gain for large changes in transistor beta.

What is claimed is:

1. A constant gain amplifier for use in high nuclear bombardment environments comprising:
   a. an emitter-follower transistor stage whose output is fed to a Darlington stage and whose input includes a bypass from the base to the emitter circuit of said emitter follower, said bypass including variable attenuation means,
   b. said variable attenuation means including impedance means whose value increases with decreasing beta of said emitter follower stage,
   c. whereby as beta diminishes due to neutron bombardment the impedance of the variable attenuation means in the bypass increases to thereby maintain uniform amplifier gain.
2. The amplifier of claim 1 wherein said variable attenuation means includes a first diode in series with a first resistance.
3. The amplifier of claim 2 including a second diode and a second resistance, said second diode connected across said first resistance, said second resistance connected between the anode of the second diode and the emitter circuit of the emitter follower stage.
4. The amplifier of claim 3 including a Zener diode and a third resistance, both in series with said first resistance and in parallel with each other.
5. The amplifier of claim 2 wherein the current normally passing through said first diode, prior to any neutron bombardment, is such as to yield maximum diode impedance change for changes in diode current.
6. The amplifier of claim 3 wherein the current normally passing through the second diode, prior to any neutron bombardment, is such as to yield maximum diode impedance change for changes in diode current.
7. The amplifier of claim 3 including a capacitor and a third resistance, both connected in series coupled between the cathode of said first diode and the anode of said second diode.

* * * * *